US008812978B2

(12) United States Patent
Eschbach et al.

(10) Patent No.: US 8,812,978 B2
(45) Date of Patent: Aug. 19, 2014

(54) SYSTEM AND METHOD FOR DYNAMIC ZOOM TO VIEW DOCUMENTS ON SMALL DISPLAYS

(75) Inventors: Reiner Eschbach, Webster, NY (US); Emil V. Rainero, Penfield, NY (US); Zhigang Fan, Webster, NY (US); Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 2326 days.

(21) Appl. No.: 11/315,993

(22) Filed: Dec. 22, 2005

(65) Prior Publication Data
US 2007/0150829 A1    Jun. 28, 2007

(51) Int. Cl.
G06F 3/048    (2013.01)
G06F 17/21    (2006.01)

(52) U.S. Cl.
CPC .................................. *G06F 17/211* (2013.01)
USPC ........................................................ 715/801

(58) Field of Classification Search
USPC .......... 715/781, 788, 800, 801, 864; 345/629; 382/164, 170, 171, 173, 176, 358
See application file for complete search history.

(56) References Cited

U.S. PATENT DOCUMENTS

| | | | |
|---|---|---|---|
| 5,157,740 A | 10/1992 | Klein et al. | |
| 5,210,824 A | 5/1993 | Putz et al. | |
| 5,450,502 A | 9/1995 | Eschbach et al. | |
| 5,581,370 A | 12/1996 | Fuss et al. | |
| 5,703,965 A | 12/1997 | Fu et al. | |
| 5,872,569 A | 2/1999 | Salgado et al. | |
| 5,883,979 A | 3/1999 | Beretta et al. | |
| 5,963,201 A | 10/1999 | McGreggor et al. | |
| 5,991,445 A | 11/1999 | Kato | |
| 6,035,324 A | 3/2000 | Chang et al. | |
| 6,128,021 A | 10/2000 | Van Der Meulen et al. | |
| 6,175,427 B1 | 1/2001 | Lehmbeck et al. | |
| 6,222,642 B1 | 4/2001 | Farrell et al. | |

(Continued)

FOREIGN PATENT DOCUMENTS

| | | |
|---|---|---|
| GB | 2343807 A | 5/2000 |
| WO | WO0024188 | 4/2000 |

(Continued)

OTHER PUBLICATIONS

Eschbach et al.; U.S. Appl. No. 10/901,240, filed Jul. 29, 2004; Client Dependent Image Processing for Browser-Based Image Document Viewer for Handheld Client Devices.

(Continued)

*Primary Examiner* — Rashawn Tillery
(74) *Attorney, Agent, or Firm* — Duane C. Basch; Basch & Nickerson LLP (57) ABSTRACT

A system and method for dynamic zoom adjustment based, in part, upon: the raster data in the user selected local area is disclosed; and/or the knowledge of a prevailing font size in a user selected region such that the text in that region is enlarged to be just readable. To achieve this, the detail in the local area is examined and a zoom factor is calculated that depends on the image detail and/or the viewing screen resolution. A document server may be employed to develop the information needed to enable this functionality. In one embodiment, the information is developed by RIPping the document, and then storing a spatial map of localized details (e.g., font sizes at several display resolutions) to automatically adjust a zoom level or factor and thereby facilitate navigation and reading.

20 Claims, 8 Drawing Sheets

(56) References Cited

U.S. PATENT DOCUMENTS

| | | |
|---|---|---|
| 6,240,215 B1 | 5/2001 | Salgado et al. |
| 6,314,452 B1 | 11/2001 | Dekel et al. |
| 6,345,128 B1 | 2/2002 | Stokes |
| 6,449,639 B1 | 9/2002 | Blumberg |
| 6,456,340 B1 | 9/2002 | Margulis |
| 6,469,805 B1 | 10/2002 | Behlok |
| 6,484,631 B2 | 11/2002 | Degani et al. |
| 6,501,472 B1 | 12/2002 | Hunt et al. |
| 6,538,661 B1 | 3/2003 | Farnung et al. |
| 6,539,547 B2 | 3/2003 | Driscoll et al. |
| 6,594,687 B1 | 7/2003 | Yap et al. |
| 6,606,418 B2 | 8/2003 | Mitchell et al. |
| 6,618,171 B1 | 9/2003 | Tse et al. |
| 6,628,843 B1 | 9/2003 | Eschbach et al. |
| 6,708,309 B1 | 3/2004 | Blumberg |
| 6,744,918 B1 * | 6/2004 | Caldato et al. ............. 382/164 |
| 6,744,927 B1 | 6/2004 | Kato |
| 6,754,231 B1 | 6/2004 | Jonsson et al. |
| 6,792,607 B1 | 9/2004 | Burd et al. |
| 6,826,310 B2 | 11/2004 | Trifonov et al. |
| 6,832,353 B2 * | 12/2004 | Itavaara et al. ............. 715/744 |
| 6,874,131 B2 | 3/2005 | Blumberg |
| 6,944,357 B2 | 9/2005 | Bossut et al. |
| 6,961,750 B1 | 11/2005 | Burd et al. |
| 6,963,668 B2 | 11/2005 | Engeldrum |
| 6,970,602 B1 | 11/2005 | Smith et al. |
| 6,983,083 B2 | 1/2006 | Fedorovskaya et al. |
| 7,031,534 B2 | 4/2006 | Buckley |
| 7,065,255 B2 | 6/2006 | Chen et al. |
| 7,200,615 B2 | 4/2007 | Eschbach et al. |
| 7,218,789 B2 | 5/2007 | Faber et al. |
| 7,219,309 B2 * | 5/2007 | Kaasila et al. ............. 715/800 |
| 7,227,557 B2 * | 6/2007 | Nakajima .................... 345/629 |
| 7,287,220 B2 * | 10/2007 | Kaasila et al. ............. 715/201 |
| 7,339,573 B2 * | 3/2008 | Andert et al. ............. 345/157 |
| 7,539,341 B2 | 5/2009 | Eschbach et al. |
| 7,620,892 B2 | 11/2009 | Rainero et al. |
| 2001/0035979 A1 | 11/2001 | Pornbacher |
| 2002/0056010 A1 | 5/2002 | Lincoln et al. |
| 2002/0085233 A1 | 7/2002 | Degani et al. |
| 2002/0087728 A1 | 7/2002 | Deshpande et al. |
| 2002/0107988 A1 | 8/2002 | Jordan |
| 2002/0112114 A1 | 8/2002 | Blair et al. |
| 2003/0018818 A1 | 1/2003 | Boliek et al. |
| 2003/0053690 A1 | 3/2003 | Trifonov et al. |
| 2003/0135649 A1 | 7/2003 | Buckley et al. |
| 2004/0030741 A1 | 2/2004 | Wolton et al. |
| 2004/0042659 A1 * | 3/2004 | Guo et al. .................... 382/176 |
| 2004/0045030 A1 | 3/2004 | Reynolds et al. |
| 2004/0100509 A1 * | 5/2004 | Sommerer et al. ............ 345/864 |
| 2004/0100510 A1 * | 5/2004 | Milic-Frayling et al. ..... 345/864 |
| 2004/0146206 A1 | 7/2004 | Matsubara |
| 2005/0086259 A1 | 4/2005 | Eschbach et al. |
| 2005/0125352 A1 | 6/2005 | Hirst |
| 2005/0188112 A1 | 8/2005 | Desai et al. |
| 2005/0244060 A1 | 11/2005 | Nagarajan et al. |
| 2005/0271283 A1 | 12/2005 | Dekel et al. |
| 2006/0026513 A1 | 2/2006 | Eschbach et al. |

FOREIGN PATENT DOCUMENTS

| | | |
|---|---|---|
| WO | WO0075859 | 12/2000 |
| WO | WO0077741 | 12/2000 |
| WO | WO0154397 | 7/2001 |
| WO | WO0163558 | 8/2001 |
| WO | WO0072517 | 11/2002 |

OTHER PUBLICATIONS

Eschbach et al.; U.S. Appl. No. 10/901,333, filed Jul. 29, 2004; Systems and Methods for Processing Image Data Prior to Compression.

Cecconi, A; Galanda, M.; Adaptive Zooming in Web Cartography; Computer Graphics Forum; vol. 21, Issue 4 (Nov. 2002).

Leiner, U.; Bernard, S.R.; Development 3-D-Widgets—Overview Lecture; Institute for Simulation and Graphics, petrol of Guericke University Magdeburg Universiity University of 2, D-39106 Magdeburg.

Leiner, U.; Bernard, S.R.; Entwicklung Von 3D-Widgets-Überblicksvortag; Institute for Simulation and Graphics, petrol of Guericke University Magdeburg Universiity University of 2, D-39106 Magdeburg.

Cecconi, A.; Kartographische Darstellung Von Statistischen Daten Im Internet; Ausgeführt am Geografischen Institut der Universität Zürich; Leitung and Betreuung Prof. Dr. R. Weibel (Giuz); Dr. A. Herzog (Stat. Amt Des Kt. ZH) 1999.

Desphande et al: "HTTP streaming of JPEG2000 images" Proceedings International Conference on Information Technology: Coding and Computing, XX, XX, Apr. 2, 2001, pp. 15-19. XP002193324 Chapter 2, 4.

Pulsifer, Alan, "JPEG 2000 Has Arrived", Advanced Imaging, May 2001.

An unofficial prosecution history of US patent 7200615 as of Dec. 23, 2009.

An unofficial prosecution history of US patent 7539341 as of Dec. 23, 2009.

An unofficial prosecution history of U.S. Appl. No. 10/901,240 as of Dec. 23, 2009.

Putz, Steve; Design & Implementation of the Design 33 Document Service; Xerox Corporation. PARC P93-00112, 1993. 15.

* cited by examiner

SYSTEM AND METHOD FOR DYNAMIC ZOOM TO VIEW DOCUMENTS ON SMALL DISPLAYS

The system and method generally relate to methods of image processing and, in particular, to methods of providing dynamic zooming of documents or sections thereof to facilitate their viewing on small display media based upon the raster data in the user selected section or a prevailing font size in a user selected section.

CROSS-REFERENCE TO RELATED APPLICATIONS

Cross-reference is made to the following related applications, which are also hereby incorporated by reference in their entirety:

U.S. patent application Ser. No. 10/687,417, for "VIEWING TABULAR DATA ON SMALL HANDHELD DISPLAYS AND MOBILE PHONES," by R. Eschbach, et al., filed Oct. 16, 2003 (published Apr. 21, 2005);

U.S. patent application Ser. No. 10/901,240, for "CLIENT DEPENDENT IMAGE PROCESSING FOR BROWSER-BASED IMAGE DOCUMENT VIEWER FOR HANDHELD CLIENT DEVICES," by R. Eschbach et al, filed Jul. 29, 2004; and U.S. patent application Ser. No. 10/901,333, for "SYSTEMS AND METHODS FOR PROCESSING IMAGE DATA PRIOR TO COMPRESSION," by R. Eschbach et al, filed Jul. 29, 2004.

BACKGROUND AND SUMMARY

Standard image viewing on computer displays (e.g., web browsers and other software applications) is generally achieved by implementing of set of fixed zoom levels that can either be selected directly (see e.g.: MapQuest at www.mapquest.com) or that are addressed sequentially. The problem with the preset zoom levels is that several user interactions might be required, each of which having a time lag due to transmission and a cost disadvantage due to multiple transmissions from the server to the computing workstation. Any preset zoom level will be wrong in a large number of cases. For example, the zoom level needed to read the headline of a newspaper article is different from the zoom level required to read the body of the article. It would thus be desirable that the zoom level is automatically selected, based upon the image area the user selects or is interested in viewing. It should be noted that every new image displayed by the client (workstation or computing device) is the response from a server request, that is for any zoom change or location change, a new server request is generated and the new image is transmitted to the client. Moreover, even on relatively large displays, user dissatisfaction is caused by every "useless" selection (e.g., click) the user has to make.

Textual documents are often considered "text only" meaning that all information is encapsulated in the ASCII text. In reality, a large amount of information is encapsulated in the spatial structure of the text. Moreover, documents are "best" used when the display of the documents directly reflects the intended document layout—where the zoom or magnification level is adapted to the document being viewed. In light of the potential delay or cost of retransmitting data for display, getting the display "right" is important.

Adaptive zooming has been used in cartography and computer graphics applications, as described, for example, by several researchers, including Alesandro Cecconi, et al., James D. Hollan, and Bernhard Preim et al. Documents can be viewed in either their ASCII form (if available) or in an image form, showing the spatial layout. When displaying the image of a page on small display, it is generally the case that no text can be read. Accordingly, the disclosed system and method include a locally adaptive zoom for the display that will-on user request-zoom the indicated region as a function of the local document content. The local content will be derived by image analysis of the user selected image part. In contrast to higher level document information, such as disclosed in the cross-referenced applications above, an examination of the actual raster is performed. This method is applicable to native raster documents (scans) and rendered pages.

A problem with viewing documents is the trade-off between readability of local document areas and the overall "view" of the document. The current solution to this problem is to scroll and zoom (i.e.: the user zooms to a higher magnification to read or view detail and then and scrolls if necessary). One significant problem with such functionality is that the "next" zoom level is not generally adapted to the document and is, therefore, often not adequate to read or accurately perceive the document. This leads to a high level of user dissatisfaction, particularly in situations that have a time lag or cost associated with each new view, as is the case in portable display devices (e.g., mobile/cellular telephones, personal digital assistant devices (PDAs), etc.), including Xerox'mDoc™ software enabled platforms.

For example, the phrase "Company Confidential" has a very different meaning when appearing at the top of a page than a meaning when appearing in the middle of a paragraph on that page. Consequently, textual documents are often viewed in spatial layout or image mode showing the spatial relationship of all parts. Quite often, when viewing textual documents, the full image view is used to identify an area of interest. For example, the e-mail address will be somewhere in the address block, the "total cost" will be somewhere near the bottom of the spreadsheet, etc. In such cases, image view effectuates a quicker identification of the proper location on the page. When displaying an image of a page on a small display screen a user thereof may often find it difficult to read the small text, if it can be read at all. Subsequently, the user indicates the zoom function and the image view changes the zoom in a preset fashion. However, jumping between zoom levels is also potentially time consuming and costly, leading to a need to dynamically determine an appropriate zoom level—as a function of both the image detail and the display resolution of the viewing screen.

Figure 1:
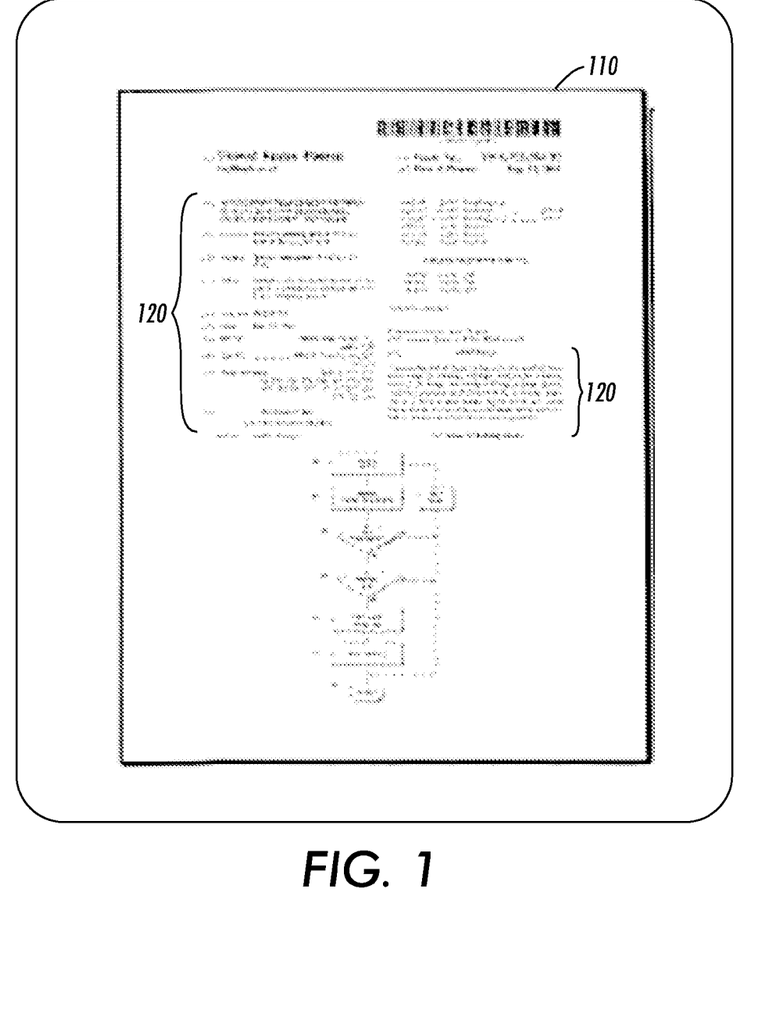
FIG. 1 is an example of an image displayed on a display screen in accordance with one of the displaced embodiments.

A patent document 110, as illustrated in FIG. 1, shows the general layout of the document but text portions 120 thereon are unreadable. Anybody familiar with the general layout of patent documents can identify different regions thereof such as, Patent Number, Issue Date, Author, Application Date, References Cited, etc., without actually being able to read the words. In this case, structural information of the document is sufficient for the user to identify a particular region of interest to zoom in on.

Preset zooming capability may also assist the user in this regard. For example, upon each user request, a click of a special key, the server will provide an enlarged image of the selected region of the document at the next zoom level. One problem, however, with a preset zoom is that several interactions might be required to get it right, with each interaction involving a time lag due to transmission between the document server and the user's display device or due to multiple transmissions having to occur. In addition, any preset zoom level may be incorrect in a number of instances. For example, the zoom level needed to read an e-mail address in a Microsoft Word® document would most likely be different from the zoom level to read a sales number in a Microsoft Power-Point® document. It would thus be desirable that the zoom level be automatically selected based on various image areas on which the user can click or otherwise select.

Figure 2:
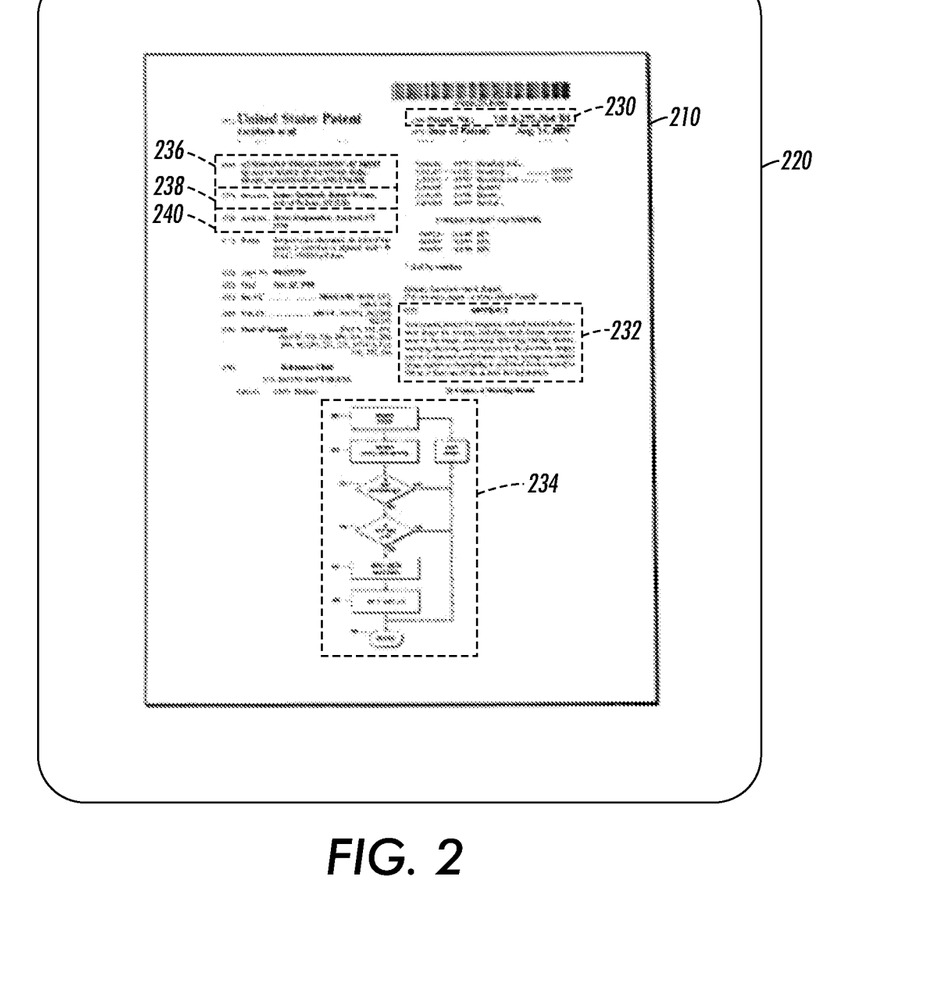
FIGS. 2-5 are illustrative examples of alternative displays of the image of FIG. 1 in accordance with aspects of embodiments disclosed herein.
Figure 3:
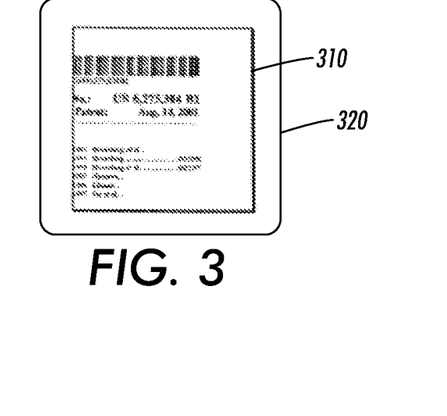
Figure 4:
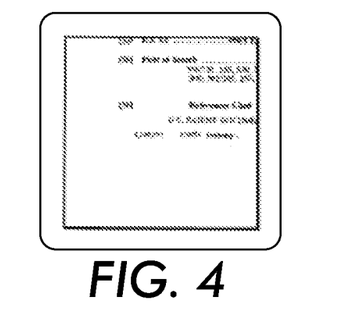
Figure 5:
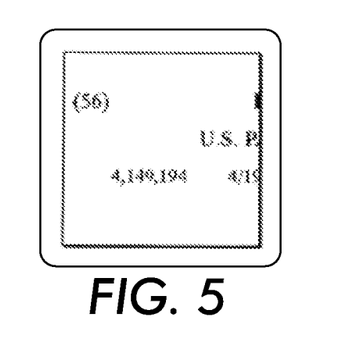

In document server, image viewer implementations, zooming results in the display of the "next" preset zoom level, for example as indicated by display image 210 in FIG. 2. Moreover, FIG. 3 illustrates, in display image 310, a zoom level needed to read the Patent Number and Date of Patent from FIG. 1 within a display window 320. Still, the Reference Cited section is not readable and the patent number is barely, if at all readable. FIG. 4 depicts the References Cited section at the identical zoom level as the one in FIG. 3. It will take the user several more "clicks" or zoom adjustments, with the corresponding latency for transmission, to be able to retrieve the desired information. As can be seen from FIG. 4, more user "clicks" are required to reach the readability of FIG. 5.

As illustrated in the examples, a large number of user zoom adjustments are required to retrieve the desired information. The exact number of adjustments depends on the size of the actual font, the zoom level increments that are encoded into the system, as well as the relative locations of the different areas. For the example given, the total number of selections will be in the order of twelve or more in order to view various portions of the patent page. It is, therefore, an aspect of the disclosed system and method to reduce the number of zoom adjustments and/or scrolling (i.e., user interventions) that are required to display desired regions of an image.

What is required is a system or method to incorporate a locally adaptive (i.e., dynamic) zoom adjustment capability into any display screen such that a zoom of an indicated region is a function of the local document content derived from the higher level document description (font size, raster resolution, etc.) contained as source information inside the original source document. Although the present description is being presented in the context of wireless transmission, it should be noted that the dynamic zoom is desirable in most embodiments where there is latency between the user request and the server response, as well as in cases, where the amount of required user interaction is intended to be reduced. Thus, even on a local computer or other workstation, it would be desirable to have a dynamic zoom that automatically adjusts the zoom ratio to the detail in the user indicated area without mandating multiple user interactions. Accordingly, as used herein, terms like "server" or "display" are intended to designate functionality, but not necessarily indicate or be limited to a particular hardware or software embodiment as described.

A method is disclosed for selecting the zoom factor when inspecting a region of a document on a soft display based on knowledge of information depicted in the region. For example, the type or font size in the region selected such that the text is "just readable," or dependent upon raster data in the user selected local area. It is understood that the output system resolution influences the "just readable" criterion and that the calculated zoom factor is a function of source size information as well as output or display capabilities.

Disclosed in embodiments herein is a method for providing a source document for display, comprising: identifying a plurality of sections of the source document, and at least one characteristic of each section; associating a display zoom factor with each identified section based upon the at least one characteristic of each section; creating an adjusted zoom image of at least a selected section in response to the zoom factor; and sending the adjusted zoom image of the selected section for display.

Also disclosed in embodiments herein is a document display system, comprising: a source document image created from a rasterized image; a server for processing the source document image and identifying a plurality of sections of the source document, and at least one characteristic of each section; and a computing device, including a display associated therewith, for displaying at least a section of the source document, wherein the section is displayed as an image received from the server, and where the image is created using a zoom factor based upon the at least one characteristic of the section.

Further disclosed in embodiments herein is a method for providing a source document for display on a handheld device, comprising: Identifying, with a server, a plurality of sections of the source document and for each section determining at least one characteristic representative of said section; for each identified section, associating at least one zoom factor therewith based on the at least one characteristic representative of said section; sending a first document image, at a first zoom level, from the server to a handheld device for display thereon; selecting, using the handheld device, a section of said document for zooming; transmitting, from said handheld device to the server, information identifying the selected section; creating on the server, in response to the information identifying the selected section, a second document image including at least a portion of the selected section at a second zoom level; and sending the second document image from the server to the handheld device.

DETAILED DESCRIPTION

Figure 6:
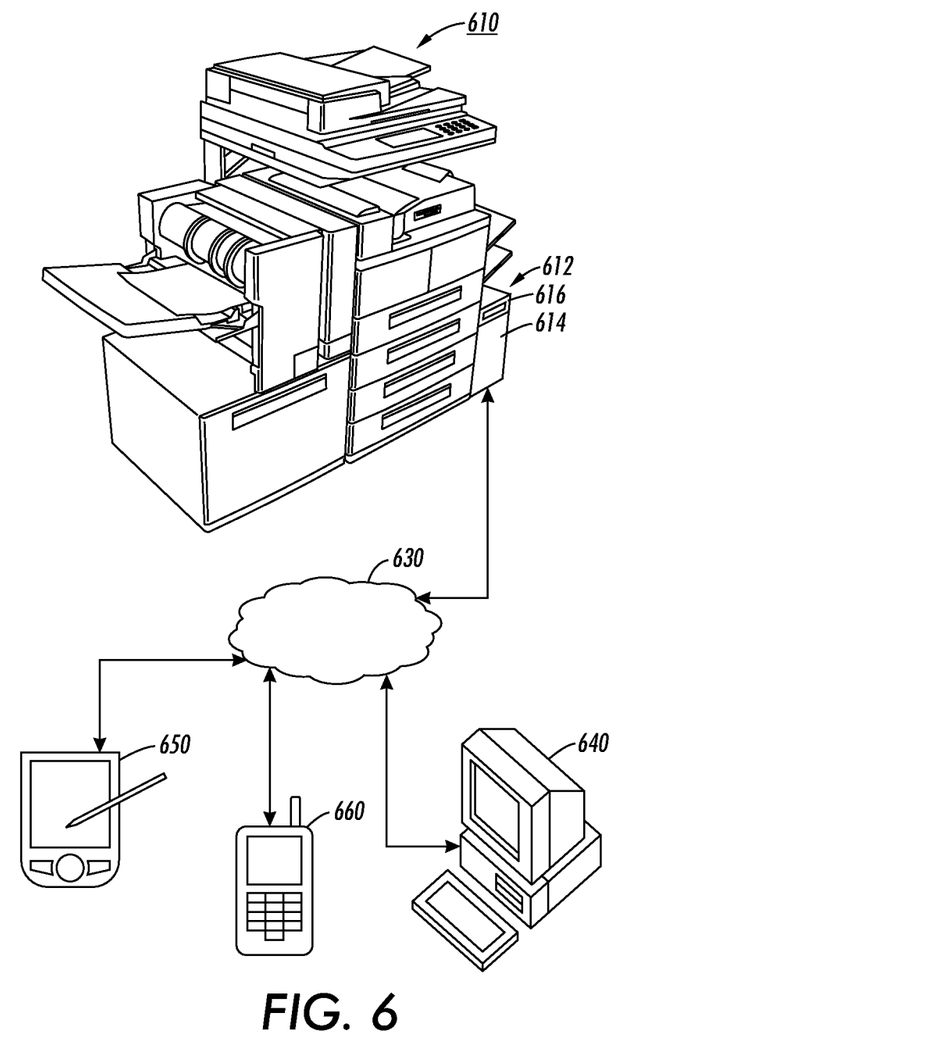
FIG. 6 Is a schematic diagram illustrating a system-level embodiment.

As described in the summary above relative to FIGS. 1-5, current display techniques, including preset zoom levels or factors and scrolling capability, often lead to user frustration and/or delay in the ability to review document information, particularly when rasterized document information is being transmitted and viewed—often on a handheld display device such as a PDA 650 or a mobile telephone 660. An exemplary embodiment for the disclosed system and methods is depicted in FIG. 6. In FIG. 6, a networked multifunction device 610 (document scanning, printing, faxing, etc.) is connected via a network 630 (including local and wide-area networks as well as the Internet) to a workstation 640 or a personal digital assistance device (PDA) 650. As will be appreciated multi-function device 610 may include a server 612 that further provides not only a networking capability, but also a processor 614 as well as mass storage 616 and other components typically found in a computer server or similar device. Furthermore, processor 614 operates in response to a series of programmed instructions to carry out or control various algorithmic and functional processes (scanning, data storage, raster input processing (RIPping), input/output, etc.) associated with both the multifunction device and/or external devices connected thereto via the network 630.

Workstation 640 and PDA 650, both computing devices, operate under the control of one or more processors and similarly operate under the control of pre-programmed software. In both cases, software may be employed to receive, store, and view document images, including those that may be transmitted to the computing devices from the server 612. As described above, one aspect of the disclosed method includes the utilization of the server 612, or a similar device, for controlling the image information transmitted to the computing devices (640, 650). In one embodiment, the processing capability of the server is employed to control the zoom factor or zoom adjustment to provide desirable zoom levels in response to user selections. It will also be understood that in order to facilitate such a system, the computing devices must communicate user commands (selections) or control signals with the server, and the medium for such communications is also the network 630.

In the embodiment depicted in FIG. 6, the document server 612 develops the information needed to execute aspects of the zoom adjustment. This may be accomplished, for example, by the document server RIPing the document and then storing a spatial map of localized type/font sizes in addition to the currently produced display. Simultaneously, depending on load, throughput, memory, etc. optimization of the system, several display resolutions of the page can be advantageously produced to facilitate navigation and reading by a user using one of the computing device 640, 650. This font size map, stored in memory 616, may then be referenced when a "zoom" adjustment was requested from the computing device and the correct magnification delivered. The font size map can be created using size information directly from the font information, or also from other higher-level size indicating information like strokes, lines, graphic/image size, etc.

Generally, all size information encapsulated in a page description language such as Adobe Postscript® or the like can be used for the creation of a font map. As used herein the terms font, font size, etc. explicitly incorporate other higher-level objects that have a size associated with them. It should be noted that every new image displayed by the client computing device 640, 650 is the response from a server request, that is for any zoom change or location change a new server request is generated and the new image is transmitted to the client. As will be appreciated, the method is particularly useful for handheld computers wherein the available display screen size is much smaller than the size of a normal page. In addition, the methods described herein are also applicable to a plurality of other windowed display system. One possible embodiment in which an image to be displayed is created is using a scanning operation on a multifunction device such as a Xerox® DocumentCenter™ class machine employing FlowPort™ scan-to-file software to produce a RiPped image file.

Figure 7:
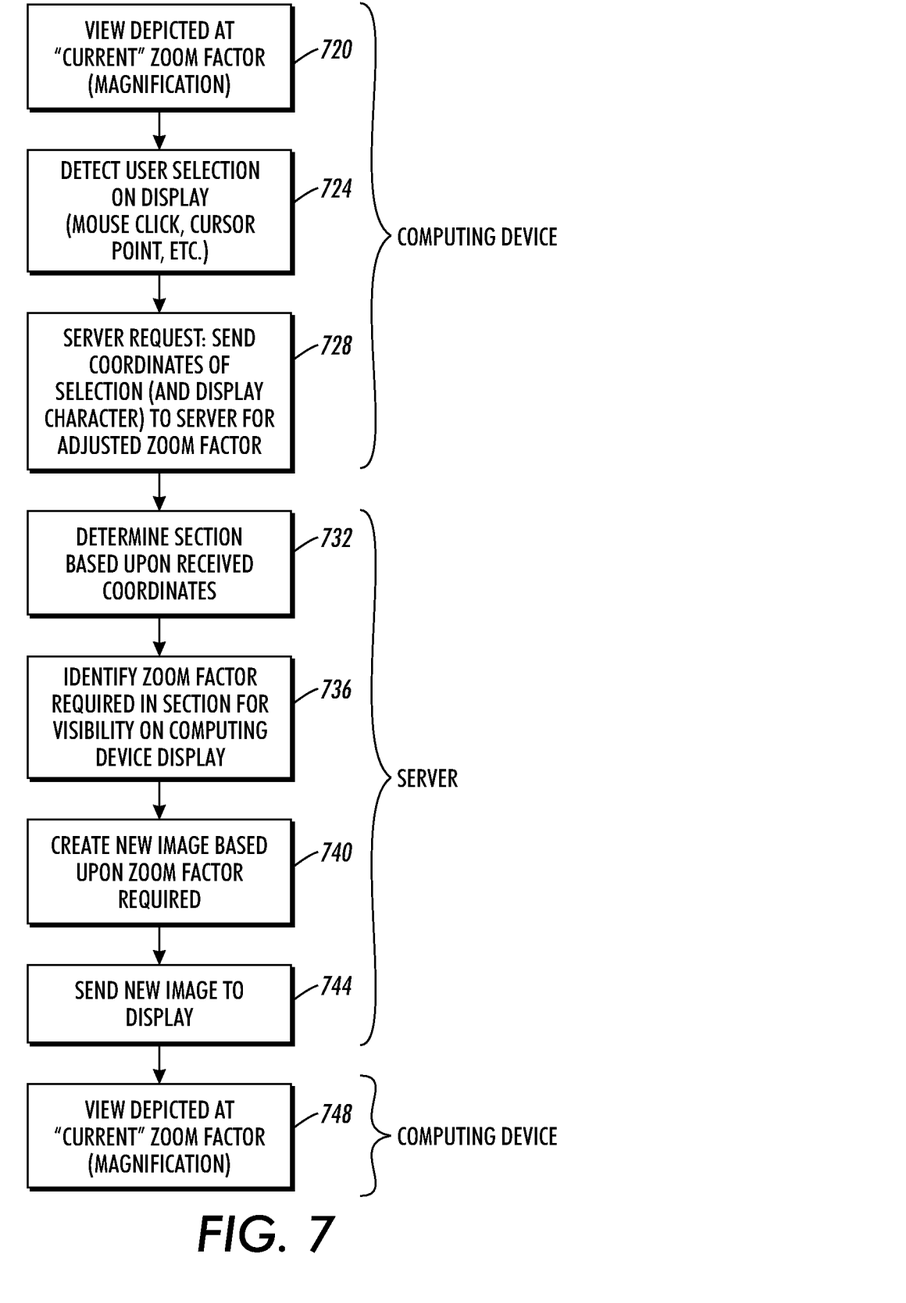
FIGS. 7 and 11-12 are flowcharts illustrating various steps in accordance with the various embodiments described herein.

Referring to FIG. 7, what is disclosed is a method for selecting a zoom factor when inspecting a region of a document on a display 220 wherein the factor of the zoom is based, in part, on knowledge of the font size or other higher level size information in a user selected region such that the text in that region is enlarged to be just readable or the graphical object is just visible. The flow diagram depicted in FIG. 7 assumes that the document being or to be displayed (e.g., image 210 in FIG. 2) has been received by the server 612 and that the document server has processed the image in order to determine regions or sections of the image and characteristics thereof. Such information might be obtained, for example, by the document server raster input processing (RiPping) the image or document and then storing a spatial map of localized font sizes at several display resolutions to facilitate navigation and reading.

As an example of localized font size or other information, the sever may identify the segments or sections depicted in FIG. 2, including the patent number 230, abstract 232, illustration 234, title 236, inventors 238 or assignee 240, among other sections. The spatial map of localized font sizes (for font sizes and styles in each section) is then referenced when a "zoom" is initiated by the user.

For example, the process may proceed as depicted in FIG. 7. The displayed image is viewed as represented by 720. When a user selects a section of the display image for further zoom adjustment, the selection is detected at 724, and the coordinates of the selection (e.g., mouse coordinates or cursor/stylus coordinates) are sent to the server, 728. The information transmitted to the server may further include information relative to the display on the computing device, particularly if such information has not been previously transmitted to the server. Such information may include a current display resolution as well as display size and display color capability.

The server, upon receiving the coordinate information and display characteristics, determines the section of the display selected for further review at step 732. Once identified, the server accesses the spatial map to determine both the nature of the information therein (text, line art, image, etc.) and calculating a desirable zoom factor or level of magnification, 736. Once the zoom factor is calculated (recognizing that the factor may have been pre-determined based upon prior processing), an image is created, 740, for transmission to the computing device for display 744. The received image is then depicted or rendered by the display on the computing device at 748. In one embodiment, every image presented on the client computing device, for example display screens 220 or 320, is the result of a server request. Any zoom change or region of interest change may generate a new server request (728) with a new image being transmitted from the server to the client (744) in response. As will be appreciated the disclosed technique is particularly useful for handheld computing devices and the like wherein the available display screen size is much smaller than the size of a normal printed page. In addition, the method disclosed herein is also applicable to a plurality of other windowed display systems and image rendering devices.

Having described the general operation of the system depicted in FIG. 6 in accordance with the method of FIG. 7, attention is now turned to further details associated with various embodiments thereof. In one embodiment, the system creates an automatic zoom based on the font size or other higher-level information of the local document area. Furthermore, on ripping, the server may generate "hint" images that are representative of sections and have a zoom or magnification level commensurate with the document's various localized font sizes. Hint images are preferably created at a low resolution. Since a trade-off exists between readability and window size, the zoom is likely to be set to the lowest readable level in order to include as much contextual information as possible in the displayed image section.

In the event that multiple font sizes are present in a localized area or section selected for viewing, then the largest font size therein may be preferred for establishing the zoom factor—the basis for selection of the appropriate zoom factor being the ability to display the "selected" section but to maintain as much context as possible. The hint data is then used to either dynamically render an image on request, or to select the pre-rendered image that best fulfills the size requirement.

Alternatively, individual representations are created for different page areas that are selected based on user input coordinates. It will also be appreciated that user or device preferences may be employed to control or permit predicted processing of the image, image sections and associated zoom factors. For example, instead of providing a zoom factor for reading the largest text or font in a section, the user may select a mode wherein the context is sacrificed for readability of all information, and the smallest font size is employed to derive the zoom factor for the selected section.

Figure 8:
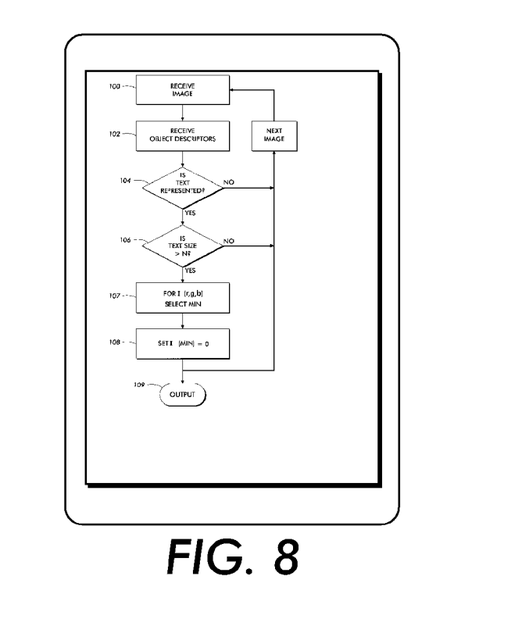
FIGS. 8-10 are further illustrative examples of image displays in accordance with the disclosure set forth relative to FIGS. 6 and 7.
Figure 9:
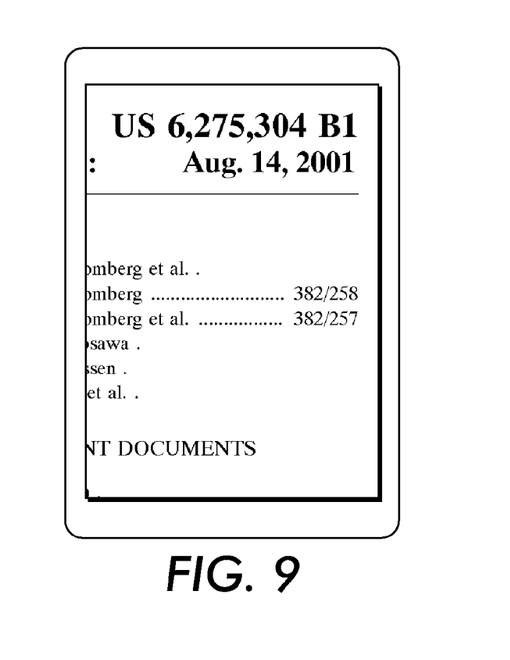

Examples of aspects of the disclosed system and method are found in FIGS. 8 and 9, where the automatic zooming to different document areas is illustrated. For example, if a user had selected, in FIG. 2, the illustration section 234, the illustration of FIG. 8 would be returned by the server (it should be appreciated that for purposes of illustration, display 220 is depicted on a smaller scale in FIGS. 8-10 than in FIG. 2). Similarly, a selection by the user in section 230 for the patent number would return an image such as depicted in FIG. 9. From FIGS. 8 and 9 it is apparent, that different zoom factors have been used for the different sections—each providing an image associated with the section selected. It is also obvious that the selected text area is readable and that selected image areas are zoomed in. Here, "text" and "image" is based on classifying the local raster data, and not based on higher-level document information.

Figure 10:
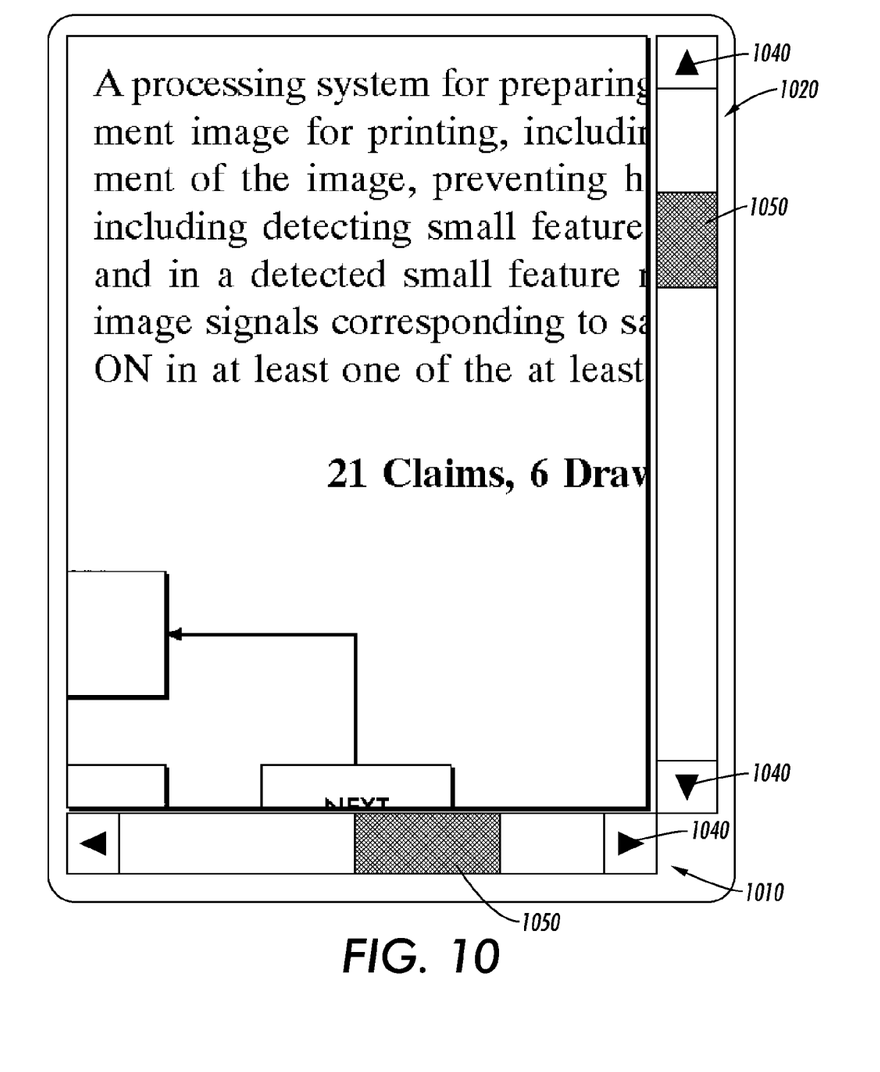

Another, alternative, embodiment is depicted generally in FIG. 10, wherein upon selecting the abstract section 232 of FIG. 2, the user is provided with a zoomed image suitable for reading. However, it may be the case that the image data in the region will not fit within the display screen, and that a user may have to further manipulate sliding navigations bars (horizontal 1010, vertical 1020) in order to move the image region being displayed. Such bars may be responsive to use selection of the arrows 1040 on the ends thereof and/or movement of the slider 1050 therein.

Figure 11:
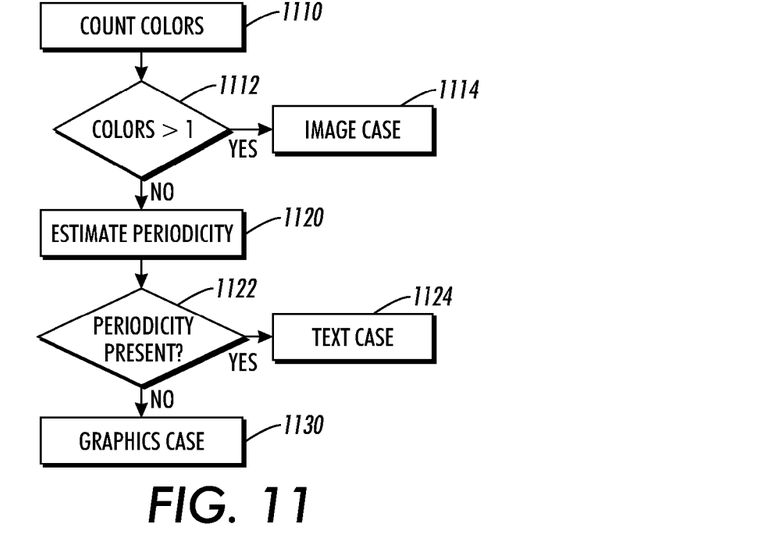
Figure 12:
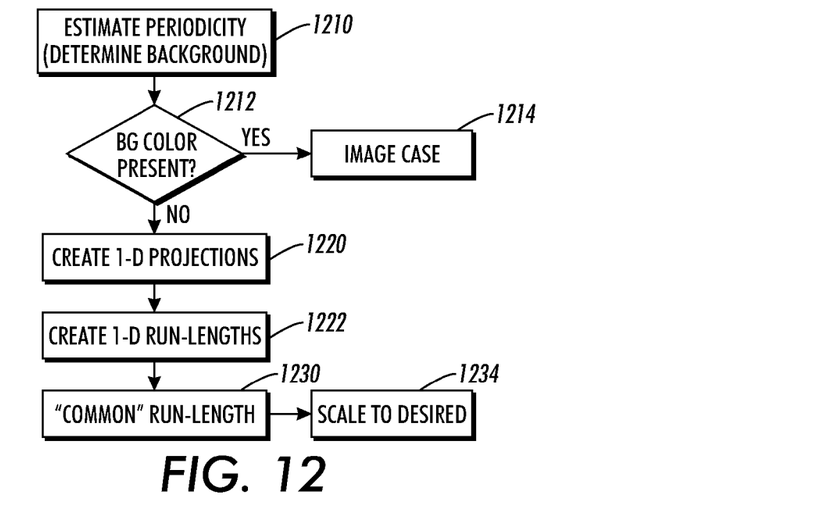

Further to the discussion above, FIGS. 11 and 12 illustrate flow diagrams depicting details relative to the methods described. In both of the depicted embodiments, processing relative determining the zoom factor is dependent upon the nature of the image. Here, two methods are used for determining the number of colors, one being an absolute metric, the other being a quantized color count to eliminate scanning noise.

Referring to FIG. 11, upon selecting a section for analysis, examination may include a determination of the number of colors present in the image section 1110. If the number of colors is above a threshold (Threshold=1; or possibly up to 500), as tested at 1112, the area is classified as an image (1114) and the default zoom is used. It is of course possible to define the image size and select an appropriate zoom level, but one embodiment contemplates using adaptive zooming only for "textual" regions. Otherwise, when the number of colors is determined to be below the threshold (1112), a periodicity estimate is performed (1120) for the region. Based upon the result of the periodicity estimate (described below relative to FIG. 12) returned at 1122, a text region is distinguished from a graphics region, steps 1124, 1130, respectively.

FIG. 12 shows the general layout of the periodicity estimation process. The first step of the periodicity estimation is the determination of a background color, 1210. If no background color is determinable, then the region being analyzed is considered an image, step 1214. Otherwise, all other colors are considered foreground. Notably, in the disclosed embodiment, no weighting is done with respect to the likelihood of black/white foregrounds and backgrounds, but it will be understood that it is possible to do so.

Subsequently, two 1-D projections are formed from the image data, 1220, and the projections are used to create the run-lengths of foreground and background colors, 1222. From the run-lengths, the "common" run-length is determined, 1230, currently by averaging the run-lengths that do not touch the window boundary. Additionally, the number of run-lengths is checked to verify that a periodicity metric is valid. Once the common run-length is determined, 1230, a scale factor is calculated, 1234, that adjusts this run-length to the desired run-length. For example, a desired run-length of fourteen pixels may be employed, or another value in the range of about eight to about twenty pixels, may be used. This assures that the "common" run-length corresponds to an image size that would result in readable text (e.g. text fourteen pixels high). Here again, as noted above, this may be a user/system defined value that provides readability for the user. For example, a person having some visual impairment might choose a desired run length that is larger to assure that text in the image sections is readable.

Alternatively, the method might be performed without the 1-D projections, simply creating run-length histograms that are used to determine common run-length. It is also believed to be desirable to performed the analysis described relative to FIGS. 11 and 12 on RIPped data, thus assuring noise free data and accurate scanline alignment. As can be seen from the examples of FIGS. 2, and 8-10, different zoom ratios were used in the different sections for drawings versus text. Similar zoom factors will be employed between the display of pictures versus text.

As described earlier, the periodicity calculations in these examples were accomplished by projection onto the vertical axis. This is an error prone method that can be confused by vertical lines between columns (some newspapers), by an image skew due to a bad registration on the scanner, or by a line or font size mismatch between two neighboring columns. However, such problems can be eliminated if the run-length histogram is used before projection.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing a source document image for display, comprising:
   identifying a plurality of sections of the source document image, and at least one characteristic of each of the sections;
   associating a display zoom factor with each of the identified sections based upon the at least one characteristic of each section;
   creating an adjusted zoom image of at least a selected section for display in response to the display zoom factor for the selected section;
   sending the adjusted zoom image of the selected image section for display; and
   displaying the adjusted zoom image.

2. The method of claim 1, wherein at least one characteristic of each section is identified during a raster input processing operation performed on the source document.

3. The method of claim 2, further comprising generating a spatial map of the source document.

4. The method of claim 3, wherein the zoom factor is based on said spatial map.

5. The method of claim 1, further comprising identifying sections in the source document as one of the group consisting of: text, image and graphic.

6. The method of claim 5, wherein identifying sections comprises detecting the presence of colors in the section, and if the number of colors is greater than a predefined threshold, characterizing the section as an image.

7. The method of claim 6, wherein identifying sections further comprises, for those sections not characterized as an image, estimating the periodicity of the section, and if periodicity is present, characterizing the section as text, otherwise characterizing the section as graphic.

8. The method of claim 1, wherein the display zoom factor is determined as a function of a font size within the selected section.

9. The method of claim 8, wherein the display zoom factor is determined as a function of a largest font size within the selected section.

10. The method of claim 7, further comprising creating a projection of the image within the selected section and deriving run lengths therefrom, wherein a common run length is selected and employed to determine the zoom factor suitable to alter the common run length to a desired size on the display.

11. A document image display system, comprising:
a source document image created from a rasterized image;
a server for processing the source document image and identifying a plurality of sections of the source document, and at least one characteristic of each of the sections;
memory for storing the at least one characteristic for each of the plurality of sections; and
a computing device, including a display associated therewith, for displaying at least a section of the source document, wherein the section is displayed as an image received from the server, and where said image is created for display using a display zoom factor based upon the at least one characteristic of the section.

12. The document display system of claim 11, further including a network, interconnecting the server and the computing device, wherein the computing device transmits a user's selection to the server, and where the server, in response to the selection, creates an adjusted zoom image of at least the selected section in response to the zoom factor, and then sends the adjusted zoom image of the selected section back to the computing device for display.

13. The document display system of claim 12, wherein the computing device transmits and the server receives information about said user's display before identifying source document regions.

14. The document display system of claim 11, wherein the server processes the raster image to identify sections in the source document and characterizes each section as one of the group consisting of: text, image and graphic, and stores the information identifying and characterizing each section in memory.

15. A method for providing a source document for display on a handheld device, comprising:
identifying, with a server, a plurality of sections of the source document and for each section determining at least one characteristic representative of each of said sections;
for each identified section, associating at least one display zoom factor therewith based on the at least one characteristic representative of said section;
sending a first document image, at a first zoom level, from the server to a handheld device for display thereon;
selecting, using the handheld device, at least one of said sections of said document for zooming;
transmitting, from said handheld device to the server, information identifying the selected section;
creating on the server, in response to the information identifying the selected section, a second document image including at least a portion of the selected section at the display zoom factor; and
sending the second document image from the server to the handheld device.

16. The method of claim 15, further including sending from the handheld device to the server information characterizing at least one aspect of a display associated therewith.

17. The method of claim 16 wherein the zoom factor is also a function of the at least one aspect of the display.

18. The method of claim 15, wherein the at least one characteristic representative of said section is selected from the group consisting of: text, image and graphic.

19. The method of claim 18, wherein identifying a plurality of sections comprises detecting the presence of colors in the section, and if the number of colors is greater than a predefined threshold, characterizing the section as an image and setting the display zoom factor accordingly.

20. The method of claim 19, wherein identifying a plurality of sections further comprises, for those sections not characterized as an image, estimating the periodicity of the section, and if periodicity is present, characterizing the section as text and setting the display zoom factor to permit reading of the text therein, otherwise characterizing the section as graphic and setting the display zoom factor accordingly.

* * * * *